United States Patent [19]
Mita

[11] Patent Number: 5,706,368
[45] Date of Patent: Jan. 6, 1998

[54] IMAGE PROCESSING APPARATUS AND METHOD HAVING DETECTION OF BACKGROUND COLOR AND ENCODING OF COLOR IMAGE DATA

[75] Inventor: Yoshinobu Mita, Kawasaki, Japan

[73] Assignee: Canon Kabushiki Kaisha, Tokyo, Japan

[21] Appl. No.: 306,536

[22] Filed: Sep. 15, 1994

Related U.S. Application Data

[63] Continuation of Ser. No. 809,144, Dec. 18, 1991, abandoned.

[30] Foreign Application Priority Data

Dec. 26, 1990 [JP] Japan ................ 2-406681
Oct. 23, 1991 [JP] Japan ................ 3-275408

[51] Int. Cl.⁶ ........................................ H04N 1/407
[52] U.S. Cl. .................... 382/284; 358/538; 358/539; 358/450
[58] Field of Search ............... 358/538, 539, 358/540, 530, 534, 529, 426, 261.1, 261.2, 261.3, 450, 453; 382/56, 166, 284; 348/586, 587

[56] References Cited

U.S. PATENT DOCUMENTS

| | | | |
|---|---|---|---|
| 4,682,215 | 7/1987 | Adachi | 358/539 |
| 4,723,129 | 2/1988 | Endo et al. | 346/1.1 |
| 4,741,046 | 4/1988 | Matsunawa et al. | 358/464 |
| 4,922,349 | 5/1990 | Abe et al. | 358/75 |
| 4,974,071 | 11/1990 | Maeda | 358/75 |
| 4,975,768 | 12/1990 | Takaraga | 358/538 |
| 5,060,280 | 10/1991 | Mita et al. | 382/33 |
| 5,267,333 | 11/1993 | Aono et al. | 382/56 |
| 5,289,296 | 2/1994 | Yamada | 358/530 |
| 5,353,063 | 10/1994 | Yagisawa et al. | 348/586 |
| 5,353,132 | 10/1994 | Katsuma | 358/539 |
| 5,361,147 | 11/1994 | Katayama et al. | 358/539 |
| 5,363,219 | 11/1994 | Yoshida | 358/539 |

*Primary Examiner*—Kim Vu
*Attorney, Agent, or Firm*—Fitzpatrick, Cella, Harper & Scinto

[57] ABSTRACT

A color image processing apparatus, including an input unit for inputting color image data having a plurality of color components, a detecting unit for detecting background color of a color image represented by the color image data input by the input unit, a removing unit for removing the background color from the color image data having the plurality of color components, an encoding unit for encoding the color image data with the background color removed, a transmission unit for transmitting the color image data with the background color removed encoded by the encoding unit, and a selecting unit for manually selecting between a first mode, in which the removing unit is operated, and a second mode, in which the removing unit is not operated.

31 Claims, 20 Drawing Sheets

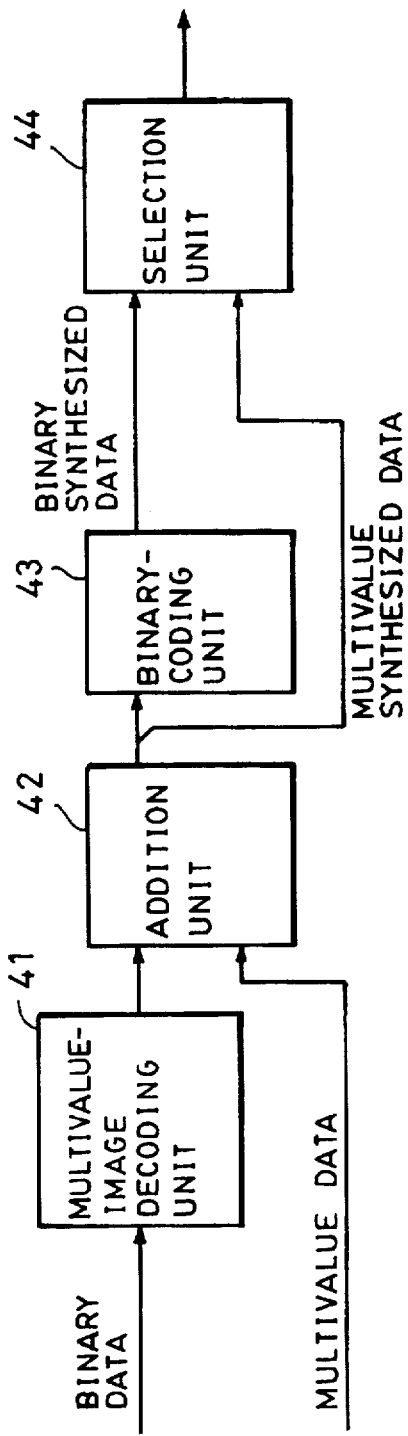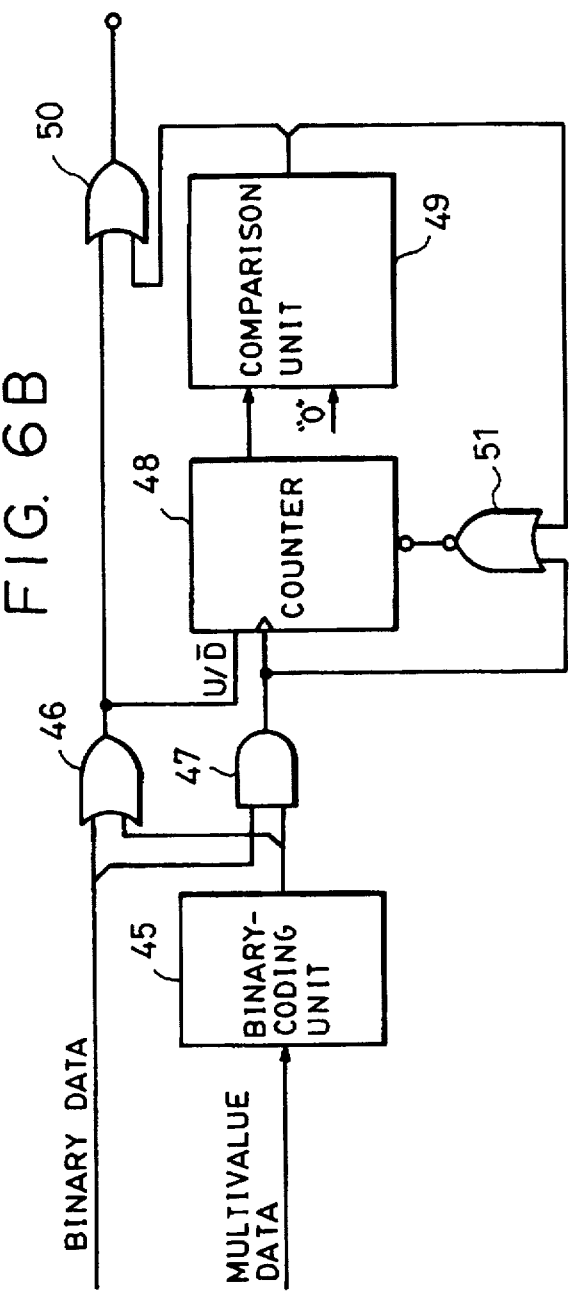

IMAGE PROCESSING APPARATUS AND METHOD HAVING DETECTION OF BACKGROUND COLOR AND ENCODING OF COLOR IMAGE DATA

This application is a continuation-in-part of application Ser. No. 07/809,144, filed Dec. 18, 1991, now abandoned.

BACKGROUND OF THE INVENTION

1. Field of the Invention

This invention relates to an image processing apparatus and method for performing image compression, and more particularly, to a technical field of compressing and transmitting a halftone image with a high efficiency.

2. Description of the Related Art

Binary black-and-white image compression, such as MH-coded MR, MMR coding and the like, has been used in facsimile apparatuses or the like as a conventional image compression technique. For a color image, it has been considered that a satisfactory result will be obtained if this binary black-and-white image compression is performed for each color component. However, the significance of a color image will disappear if sufficient gradation cannot be obtained from a binary image. Even for a black-and-white image, there has been a tendency to attach importance to reproducibility of gradation. Accordingly, gradation is provided by representing pseudo-gradation using a systematic dither method, an error diffusion method or the like as a binary-coding means.

However, a binary image represented by pseudo-gradation has a very low compression efficiency. In binary coding using the error diffusion method, the compression efficiency exceeds in some cases 1.0, that is, the capacity of data becomes greater than the capacity of the original data. Even in an image which does not have halftone, e.g., if a fog is present in the background portion of, for example, a newspaper original, the presence of the fog greatly affects the compession ratio. One means for solving such problem is to remove the density component of the background portion. For a color original, however, since the color and density component of its background has a very important meaning, removal of the background cannot solve the problem.

Even if an original mainly consisting of characters is compressed using a multivalue image compression method according to ADCT ("adaptive discrete cosine transform"), the compression efficiency is very low, and there arise problems such that the picture quality deteriorates at peripheral portions of each character.

Recently, recycled paper is frequently used with an eye toward environmental protection. In image transmission, transmission of the color of the background portion of recycled paper is in some cases unnecessary.

The importance of a background color will in some cases be determined in accordance with whether an input image is a color image or a black-and-white image, When a facsimile apparatus capable of performing color image communication and a facsimile apparatus capable of performing only black-and-white image communication are present, the importance of a background color will in some cases be determined in accordance with the capability of the communication partner,

SUMMARY OF THE INVENTION

It is an object of the present invention to solve the above-described problems in the prior art, It is a further object of the present invention to provide an image processing apparatus which can efficiently encode an image including background color.

These objects are accomplished, according to one aspect of the present invention, by a color image processing apparatus comprising input means for inputting color image data, detecting means for detecting a background color portion in a color image represented by the input color image data, first encoding means for encoding color image data of the background color portion, and second encoding means for encoding color image data of another portion in the color image.

It is a still further object of the present invention to remove unnecessary background color in image communication This object is accomplished, according to another aspect of the present invention, by a color image processing apparatus comprising input means for inputting color image data, detecting means for detecting background color of a color image represented by the input color image data, removing means for removing the background color from the color image, and encoding means for encoding the color image data representing a color image whose background color is removed.

It is still another object of the present invention to make it possible to remove background color in accordance with whether an input image is a color image or a black-and-white image.

This object is accomplished, according to another aspect of the present invention, by an image processing apparatus comprising input means for inputting image data, determining means for determining whether the input image data represent a color image or a black-and-white image, detecting means for detecting a portion of background color in an image represented by the input image data, and removing means for removing the background color from the image when the determining means determines that the input image data represent a black-and-white image.

It is still a further object of the present invention to remove background color in accordance with characteristics of a portion other than a background color portion of an input image.

This object is accomplished, according to another aspect of the present invention, by an image processing apparatus comprising input means for inputting image data, detecting means for detecting a background color portion in an image represented by the input image data, determining means for determining whether the image other than the background color portion is a color image or a black-and-white image, and removing means for removing the background color from the image when the determining means determines that the image other than the background color portion is a black-and-white image.

It is still another object of the present invention to provide an image processing apparatus which has excellent operability.

The foregoing and other objects, features and advantages of the present invention will become more apparent from the following detailed description of the preferred embodiments taken in connection with the accompanying drawings.

BRIEF DESCRIPTION OF THE DRAWINGS

FIGS. 6A, 6B and 6C are block diagrams showing examples of the data synthesis units of the FIG. 1 embodiment;

DETAILED DESCRIPTION OF THE PREFERRED EMBODIMENTS

In the preferred embodiments of the present invention to be described, a background-density portion is separated from among data components of an image, and information identifying and representing two kinds of images, i.e., a background-portion image and an image other than the background, is generated. Hence, the compression efficiency for the image other than background becomes very high.

For the background portion, since data are conserved, transmitted or subjected to other processing by a separate compression means or in a noncompressed state, the background portion can be reproduced without being lost when the data are expanded. Hence, the present invention is effective particularly for a color image or the like.

Figure 1:
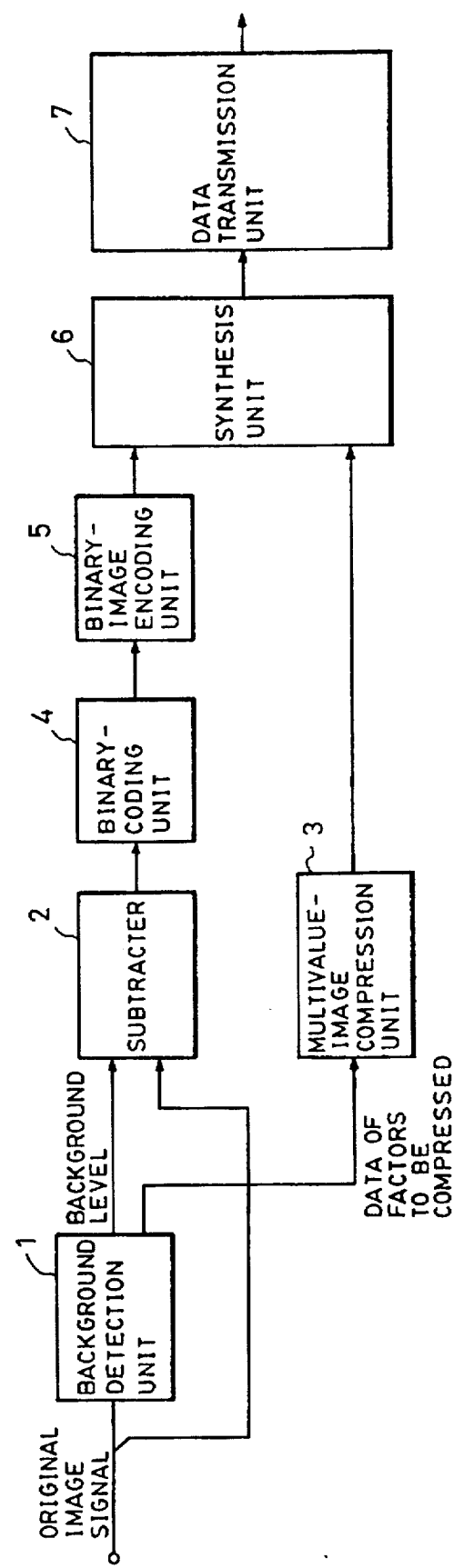
FIG. 1 is a block diagram showing an image encoding unit according to an embodiment of the present invention.

FIG. 1 shows a first embodiment of the present invention. In FIG. 1, an original image signal is first input to a background detection unit 1, where a background level and data of factors to be compressed which are closely related to the background level are obtained, and are input to a subtracter 2 and a multivalue-image compression unit 3, respectively. The data of factors to be compressed are compressed in the multivalue-image compression unit 3, and are output to a synthesis unit 6. The background level detected by the background detection unit 1 is subtracted from the original image signal in the subtracter 2 to remove a background component from the original image signal. The image signal from which the background component is removed is binary-coded in a binary-coding unit 4. The output of the binary-coding unit 4 is encoded in a binary-image encoding unit 5, and is synthesized with or simply added to multivalue-image compressed data in the synthesis unit 6. The resultant signal is output via a data transmission unit 7.

Figure 2:
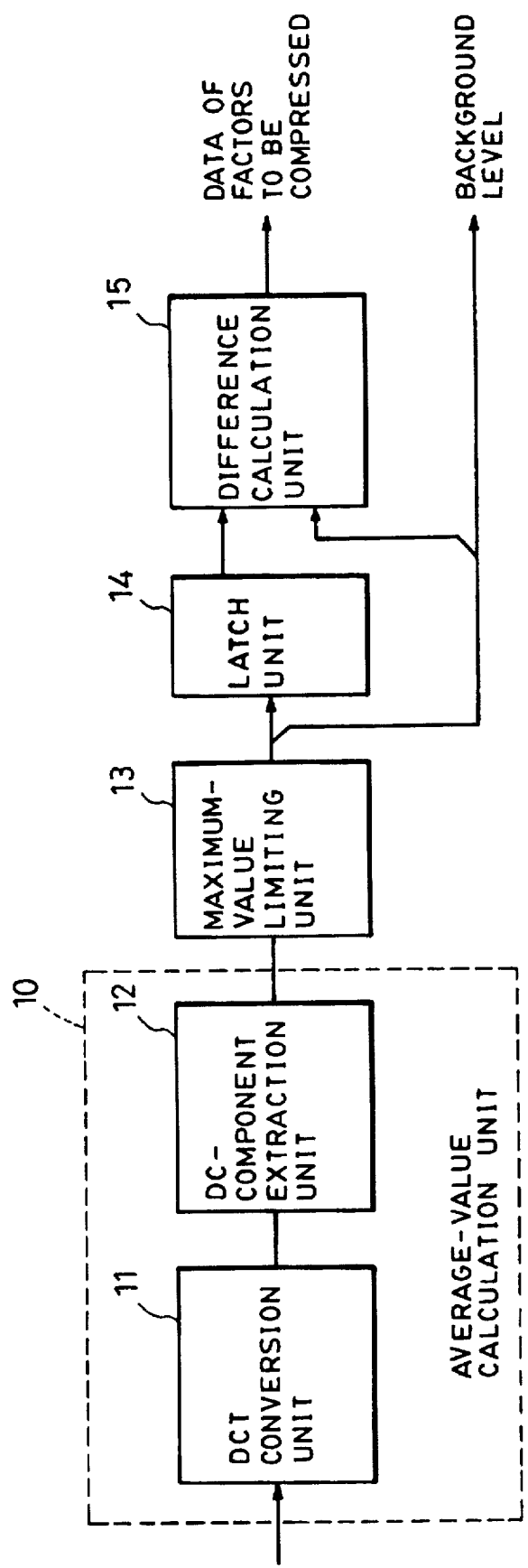
FIG. 2 is a block diagram showing an example of the background detection unit of the FIG. 1 embodiment.

FIG. 2 shows an example of the background detection unit 1. The original image signal is first input to a DCT conversion unit 11. Subsequently, the DC component of the image signal is extracted by a DC-component extraction unit 12. The portion configured by the DCT conversion unit 11 and the DC-component extraction unit 12 is termed an average-value calculation unit 10, where the average value of the image is calculated. If the output signal from the average-value calculation unit 10 equals at least a predetermined background level, the original signal value is replaced by the background level, by a maximum-value limiting unit 13 (to be described below).

Output data from the maximum-value limiting unit 13 is input to a latch unit 14 and a difference calculation unit 15. The difference calculation unit 15 outputs the difference between the data received directly from unit 13 and the data of the preceding pixel, latched in the latch unit 14, as data of factors to be compressed. The output of the maximum-value limiting unit 13 serves as the uniform background level.

Figure 3:
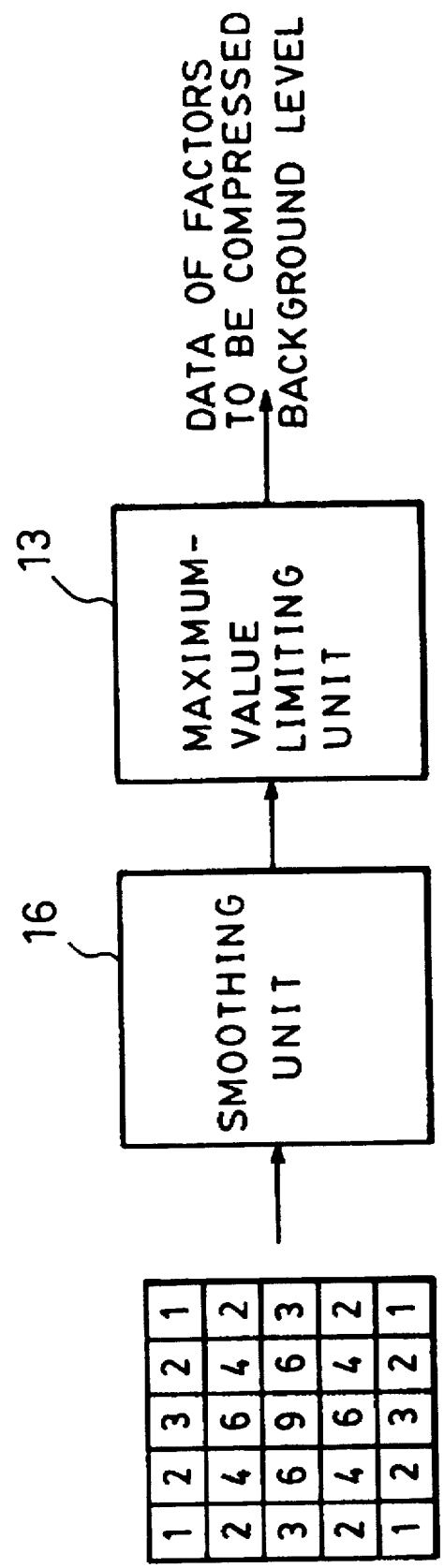
FIG. 3 is a block diagram showing another example of the background deretlon unit of the FIG. 1 embodiment.

FIG. 3 shows another example of the background detection unit 1. The original image signal is smoothed by a smoothing filter having, for example, the coefficients shown in FIG. 3 in a smoothing unit 16. The compression efficiency is improved without being affected by noise and the like because of the presence of the smoothing filter. Subsequently, the maximum value of the background level is limited by the maximum-value limiting unit 13, and data of factors to be compressed and the background level are provided.

Figure 4:
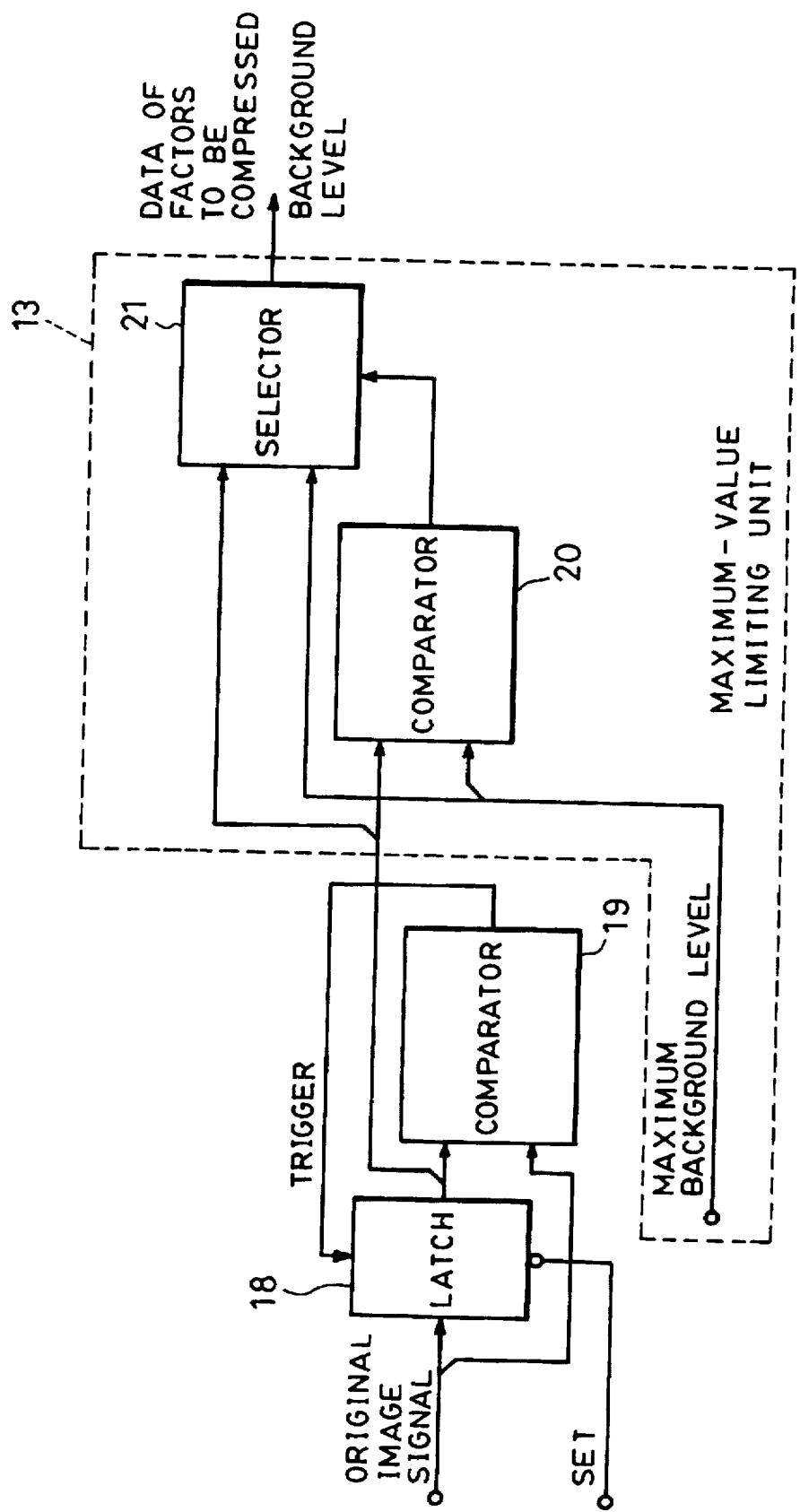
FIG. 4 is a block diagram showing still another example of the background detection unit of the FIG. 1 embodiment.

FIG. 4 shows still another example of the background detection unit 1. The original image signal is first input to a latch 18 and a comparator 19. A maximum value is set in the latch 18 by a SET signal at the first signal of one image. The output from the latch 18 is compared with the original image signal in the comparator 19. If the original image signal is smaller, TRIGGER signal is generated for the latch 18 to latch the original image signal in the latch 18. When all the image signals for one picture frame of the image have been processed in the above-described manner, a minimum value for the entire frame is latched in the latch 18. This minimum value is subjected to maximum-value limitation by the maximum-value limiting unit 13, and data of factors to be compressed and the uniform background level are obtained.

The data input to the maximum-value limiting unit 13 is input to a comparator 20 and a selector 21. The maximum background level is set in the comparator 20. If the input data exceeds the maximum background level, the selector 21 outputs the maximum background level. If the input data is less than the maximum background level, the selector 21 selects and outputs the input data.

For detecting the background level, other methods may be used, such as a method wherein a histogram is provided and the value corresponding to the maximum frequency is determined as the uniform background level.

Figure 5:
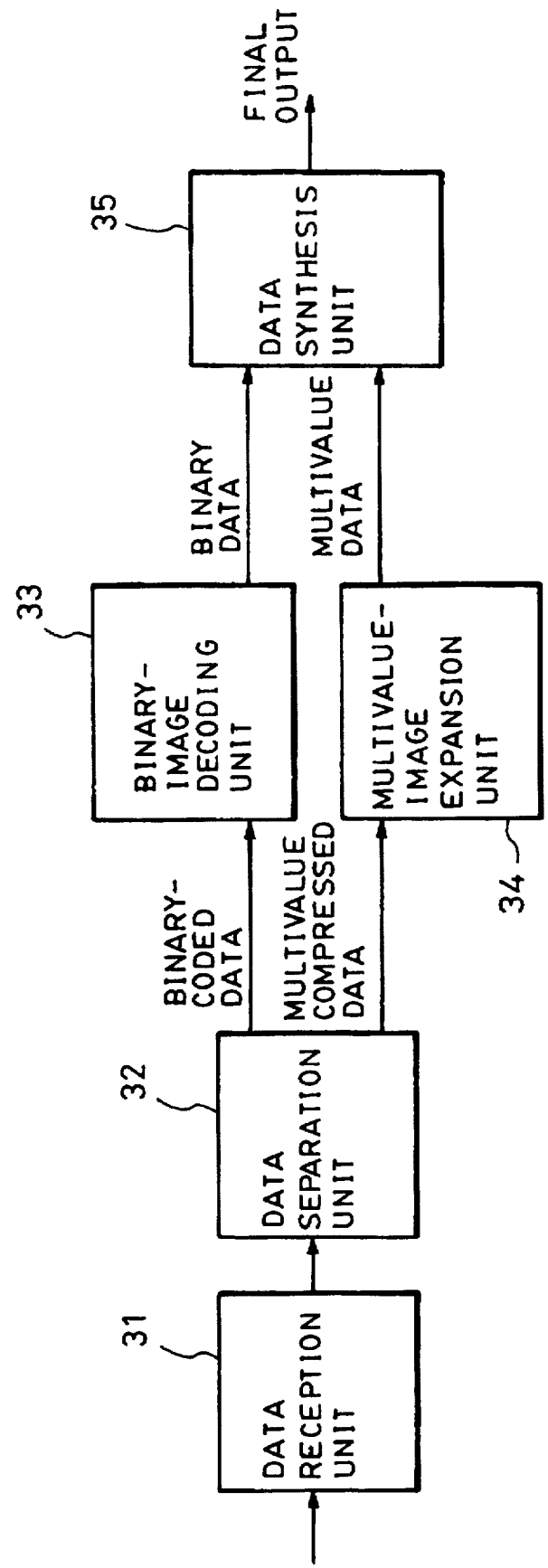
FIG. 5 is a block diagram showing an example of the image decoding unit of the FIG. 1 embodiment.

FIG. 5 shows an example of the circuit configuration for performing expansion and decoding of data encoded at the reception side when the above-described compression and encoding of the image is performed. Data received by a data reception unit 31 are separated into binary-coded data and multivalue compressed data by a data separation unit 32.

The binary-coded data are converted into binary data by a binary-image decoding unit 33, and the multivalue compressed data are expanded into multivalue data by a multivalue-image expansion unit 34. These two kinds of data are synthesized into one data stream by a data synthesis unit 35 to become final data or a final output.

FIG. 6A is an example of the configuration of the data synthesis unit 35. Binary data are converted into multivalue image data by a multivalue-image decoding unit 41. In the multivalue-image decoding unit 41, a smoothing filter may, for example, be provided. Alternatively, a 1/0 value in binary notation may, for example, simply be converted into a 255/0 value in 8-bit multivalue notation. The multivalue decoded data and multivalue data are added in an adder 42 to provide multivalue data. The multivalue data again are binary-coded by a binary-coding unit 43. A selector 44 may then utilize the necessary one of the binary-image data and the multivalue-image data in accordance with the desire of the user (i.e., in accordance with whether the printer to be used is a binary printer or a multivalue printer).

FIG. 6B is another example of the configuration of the data synthesis unit 35. Multivalue data are binary-coded by a binary-coding unit 45. Binary data and the output from the binary-coding unit 45 are input to gates 46 and 47. The OR gate 46 provides a logical sum of two image data. The AND 47 detects overlap of two images if both the two image data are "1", and increments the value stored in a counter 48 by one. The output of gate 46 performs control of incrementing decrementing the value of the counter 48. If the output of the gate 47 is "1", an OR gate 51 is instructed to generate a count-enabling signal. A comparator 49 determines whether the value of the counter 48 coincides with "0". The value in the counter 48 is decremented by one when the output of the gate 46 is "0" and the value of the counter 48 is not "0", and an OR gate 50 converts the output "0" of gate 46 into "1". Thus, according to an operation wherein the number of overlaps of two image data "1"s is counted by the counter 48, and "1" is generated to decrement the value in the counter 48 by one when the two image data are both "0", reduction of the number of dots when two images are overlapped is prevented. Hence, conservation of density becomes possible.

Figure 6C:
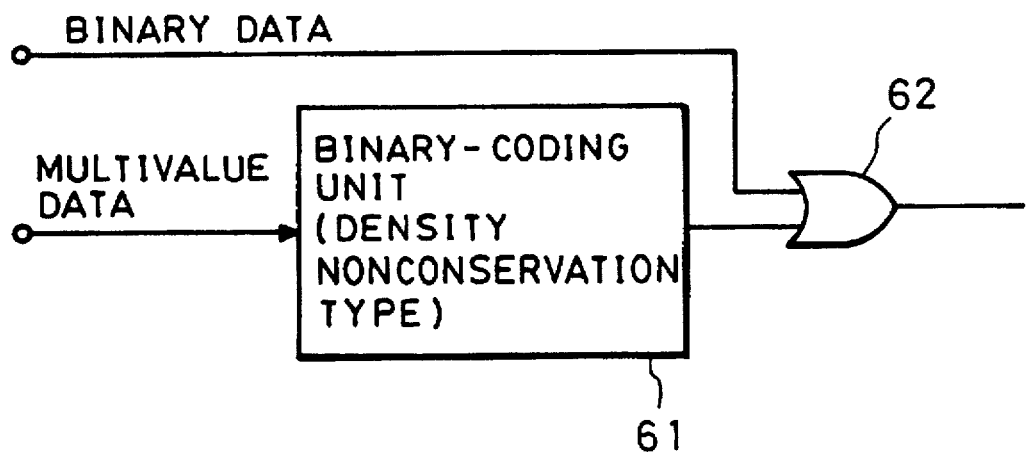

FIG. 6C is an example of a simple configuration of the data synthesis unit 35, and has a configuration which can be illustrated by cutting off part of FIG. 6B.

Multivalue data are binary-coded by a binary-coding unit 61. An OR gate 62 provides a logical sum of the output of the binary-coding unit 61 and binary data. In this case, conservation of density is not performed. However, when a binary-coding method is of density-nonconservation type, such as a systematic dither method or the like, density information is already lost. Hence, little effect will be obtained even if the configuration shown in FIG. 6B is adopted, and thus as a practical matter the configuration shown in FIG. 6C suffices.

Figure 9:
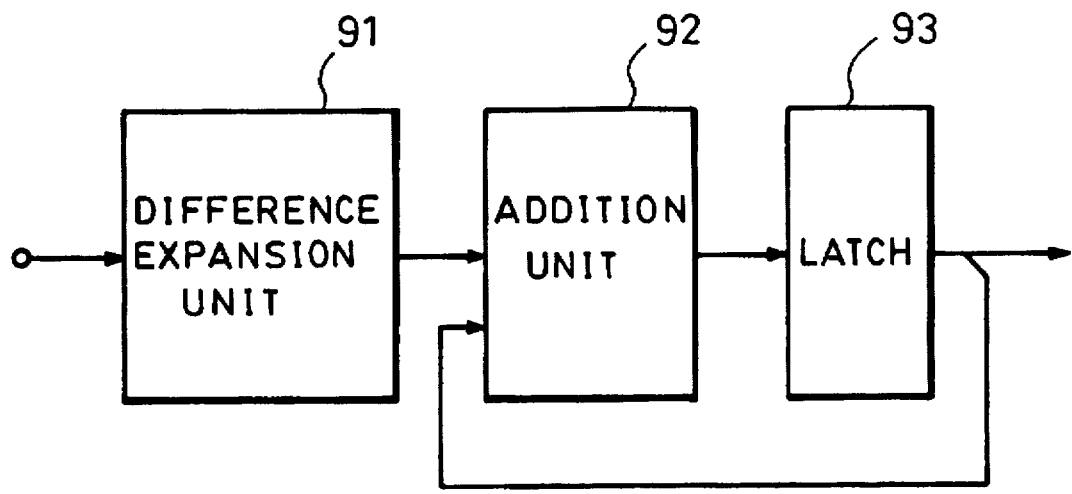
FIG. 9 is a diagram showing an example of the multivalue-image expansion unit shown in FIG. 5.

FIG. 9 is an example of the configuration of the multivalue-image expansion unit 34 shown in FIG. 5 when the data of factors to be compressed shown in FIG. 2 are compressed by the multivalue-image compression unit 3. The input is first subjected to data expansion by a difference expansion unit 91. The output of the difference expansion unit 91, being a difference, is added to the data of the preceding pixel in an adder 92. The data of the preceding pixel is latched in a latch 93. The output of the adder 92 is latched in the latch 93 in order to be processed again with the data of the next pixel. For the first pixel of one picture frame, the latch 93 is cleared, and "0" is added to the output of the adder 92.

Figure 7:
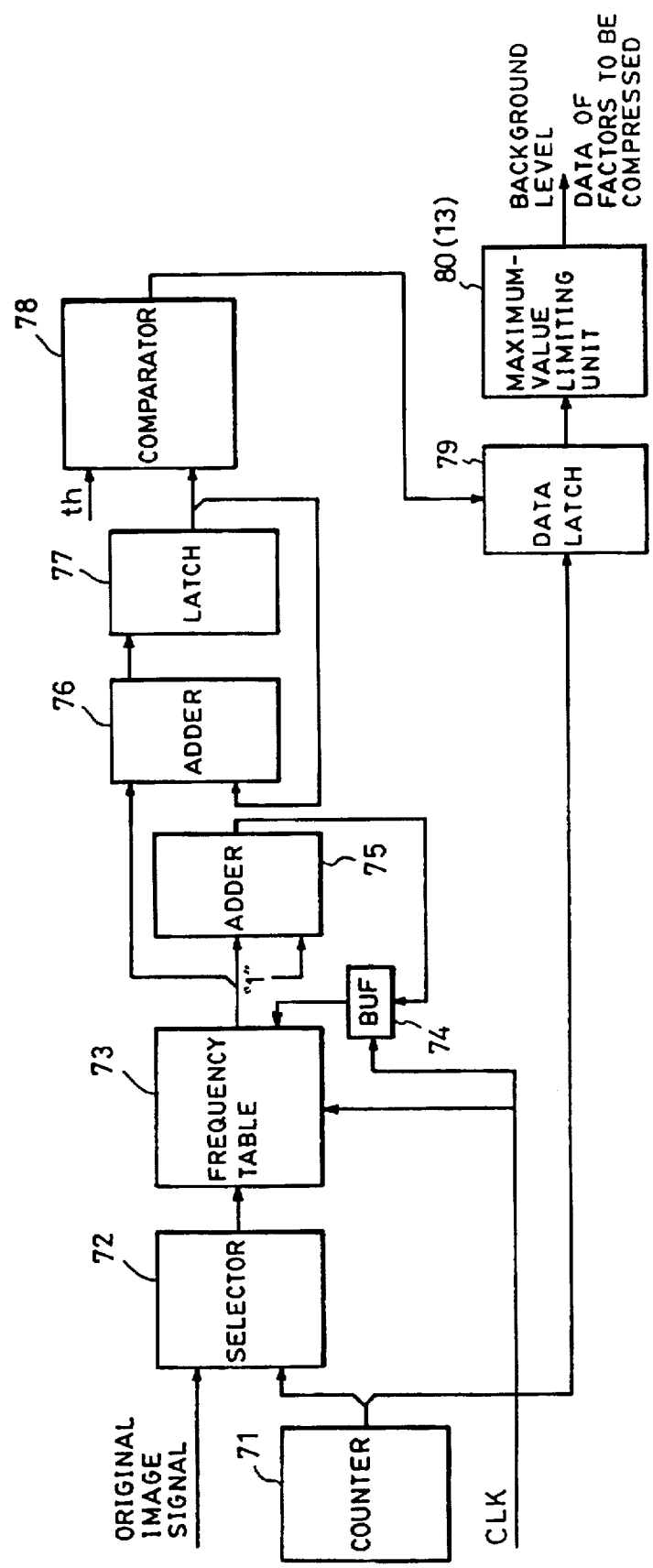
FIG. 7 is a block diagram showing still another example of the background detection unit of the FIG. 1 embodiment.

FIG. 7 is another example of the configuration of the background detection unit 1. The original image signal is provided as an address to a frequency table 73 via a selector 72. "0"s have been written in all addresses of the frequency table 73 as initial values. Data in the indicated address is read, to which "1" is added in an adder 75, and the resultant value is written in the frequency table 73 via a buffer Bur 74. For one pixel, the first half of a pixel clock signal CLK puts the frequency table 73 in a read state, and disables the Bur 74. The second half of the clock signal CLK puts the frequency table 73 in a write state, and enables the Bur 74.

Figure 8A:
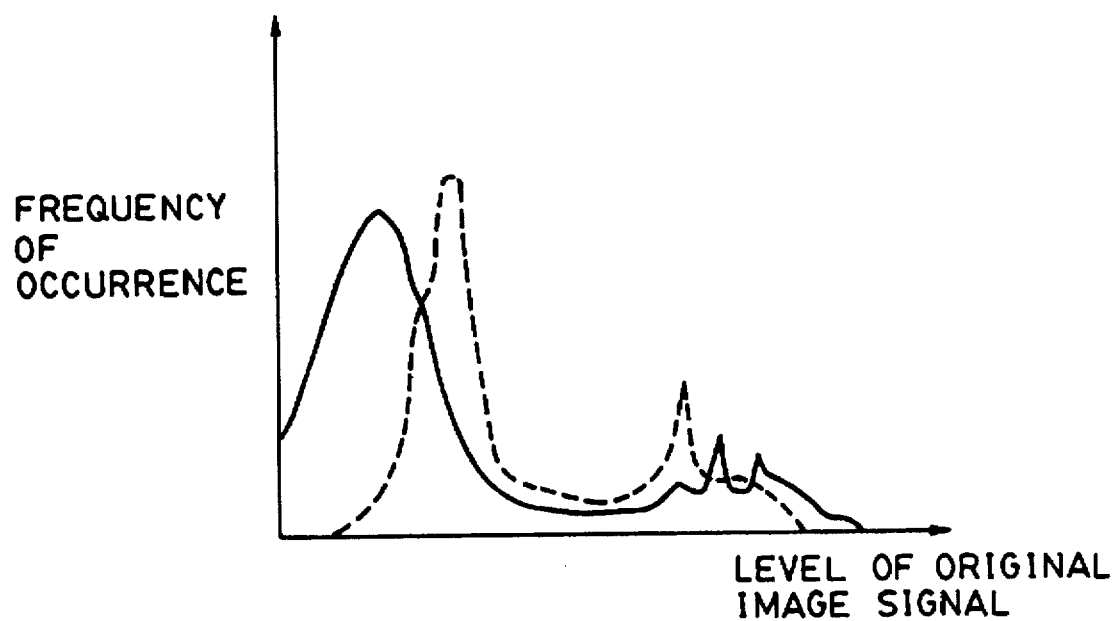
FIGS. 8A and 8B are diagrams showing the relationship between the level of the original image signal and the frequency of occurrence.

By repeating such operations for one picture frame, the distribution of the frequency of occurrence for levels of respective original image signals is obtained, as shown in FIG. 8A. In FIG. 8A, two examples of the frequency distribution are represented by the broken and the solid lines, respectively.

After the above-described operation has been completed and the frequency distribution has been obtained, a counter 71 generates data in place of the original image signal. The data is supplied as an address to the frequency table 73 via the selector 72. At that time, the frequency table 73 is in a read-only state, and the read data is supplied to an adder 76. The output of the adder 76 is latched in a latch 77 for every pixel (for every clock signal of the counter 71), and the output of the latch 77 is supplied again to the adder 76. Accordingly, an accumulated result of addition is obtained from the adder 76 and the latch 77.

Figure 8B:
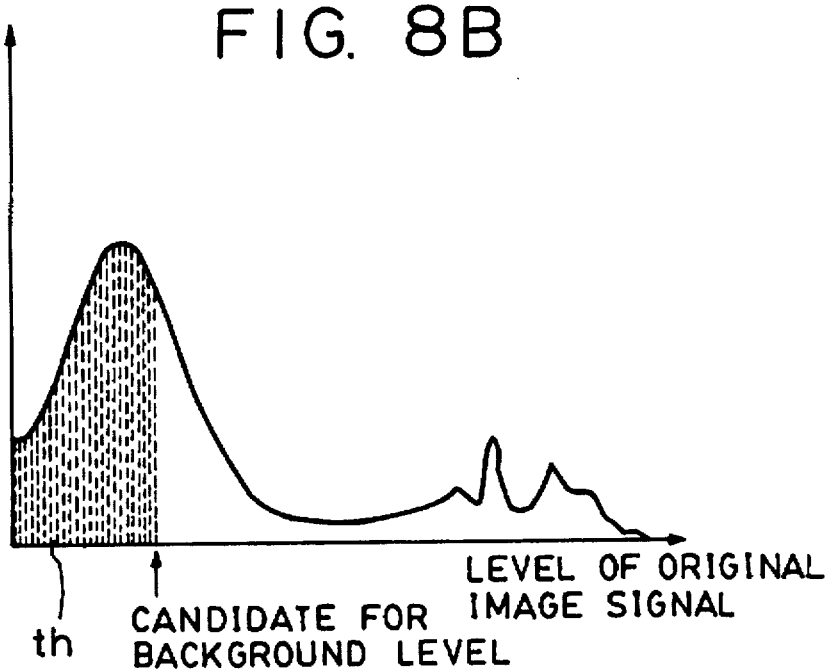

The output value of the latch 77 is compared with a threshold value th in a comparator 78. If the two values coincide or if the output value of the latch 77 exceeds the value th, a latch clock signal is generated for a data latch 79, and the output value of the counter 71 at that time is latched in the data latch 79. This value becomes a candidate signal for the uniform background level, and is subjected to maximum value limitation by a maximum-value limiting unit 80, whose output serves as the uniform background level or data of factors to be compressed. FIG. 8B shows the relationship between the value th and the candidate for the uniform background level latched in the data latch 79 in this case. The sum total of the entire frequency from the level 0 of the original image signal to the value of the candidate for the uniform background level corresponds to the area indicated by hatching in FIG. 8B, which area becomes the threshold value th.

A brief explanation will now be provided of an example how the synthesis unit 6 shown in FIG. 1 functions. It is assumed that the binary-image encoding unit 5 performs MH encoding, which is one-dimensional encoding, and the background detection unit 1 performs detection as shown in FIG. 4.

The multivalue-image compression unit 3 performs encoding by converting the background level UL into a run length. Codes may, for example, be set as a white run length UL, a black run length 0, a white run length (LL - UL) EOL (end of line), where LL represents the run length of one line. Accordingly, all decoded codes are white. For a decoder which knows this arrangement, the background level is the value "UL". If the background need not be removed, decoding may be performed by adding the background level. If the background must be removed, the background level may be neglected. A decoder which does not know the arrangement of encoding the background can of course reproduce an image wherein the background is removed. Accordingly, the synthesis unit 6 may simply add the output of the multivalue-image compression unit 3 to the head of the output of the binary-image encoding unit 5. In order to determine whether the head of the first-line data is a code for the background level or a result of compression of a usual binary image, a combination of particular codes may be provided. For example, codes may be set as white 0, black 0, white 1, black 0, white 2, black 0, white 3, black 0, white 4, black 0, . . . , white n-1, black 0, white n, black 0, white UL, black 0, white (LL - UL -n(n+1)/2).

In the above-described embodiment, since the amount of information of the background-image portion is small, it is possible to transmit raw data while omitting the multivalue-image compression unit 13.

As explained above, according to the above-described embodiment of the present invention, by separating an image into two images, i.e., an image of the background portion (background-density level) and an image of the remaining portion, and separetely encoding and compressing the two image data, it becomes possible to obtain an image having a high compression ratio without being influenced by the background level even in a character image binary-coded by an error diffusion method, or the like.

Figure 12:
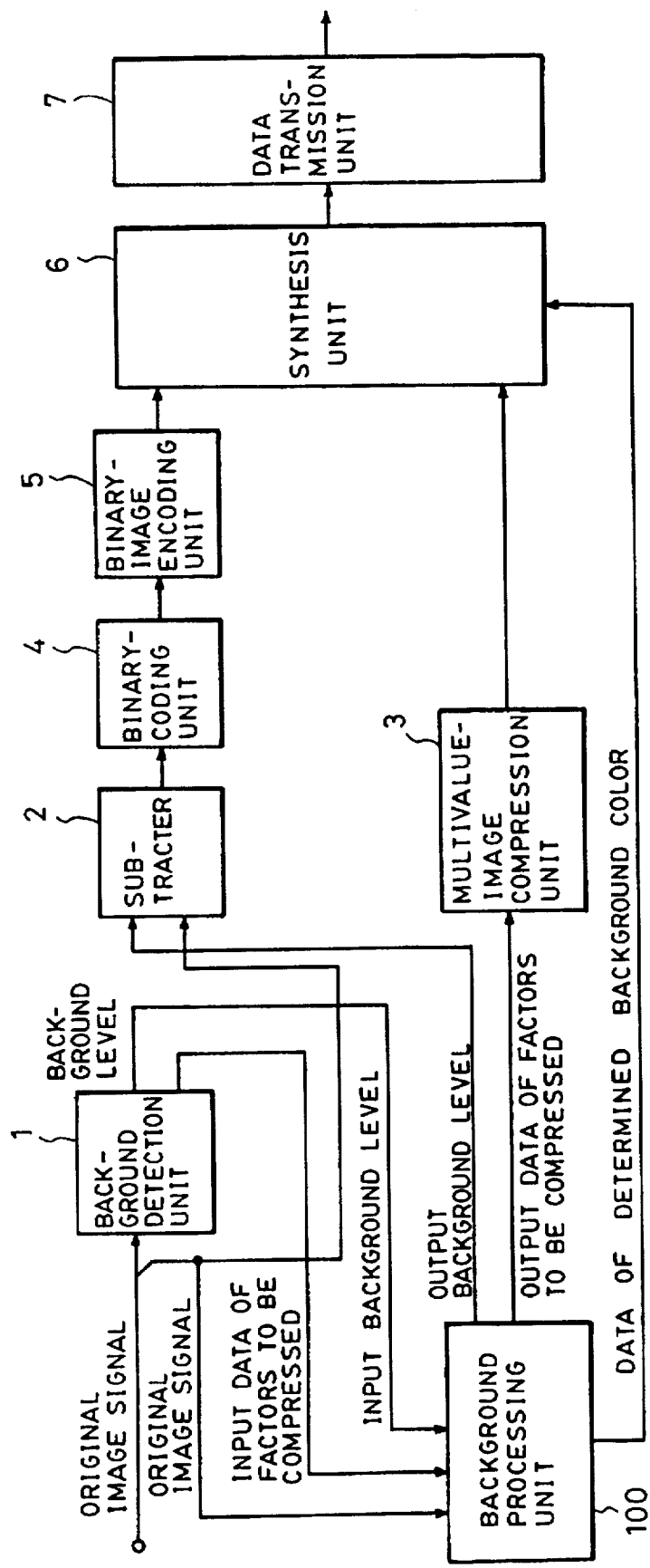
FIG. 12 is a block diagram of an image encoding unit according to a modified embodiment of the present invention.

FIG. 12 is a diagram showing another embodiment of the present invention. In FIG. 12, the background level and data of factors to be compressed output from a background detection unit 1 are input to a background processing unit 100. An original image signal is also input to the background processing unit 1. The background processing unit 100 determines whether the background image is a color image or a black-and-white image, performs processing for the background level and the data of factors to be compressed according to the result of the determination, and outputs the resultant signal.

Figure 10:
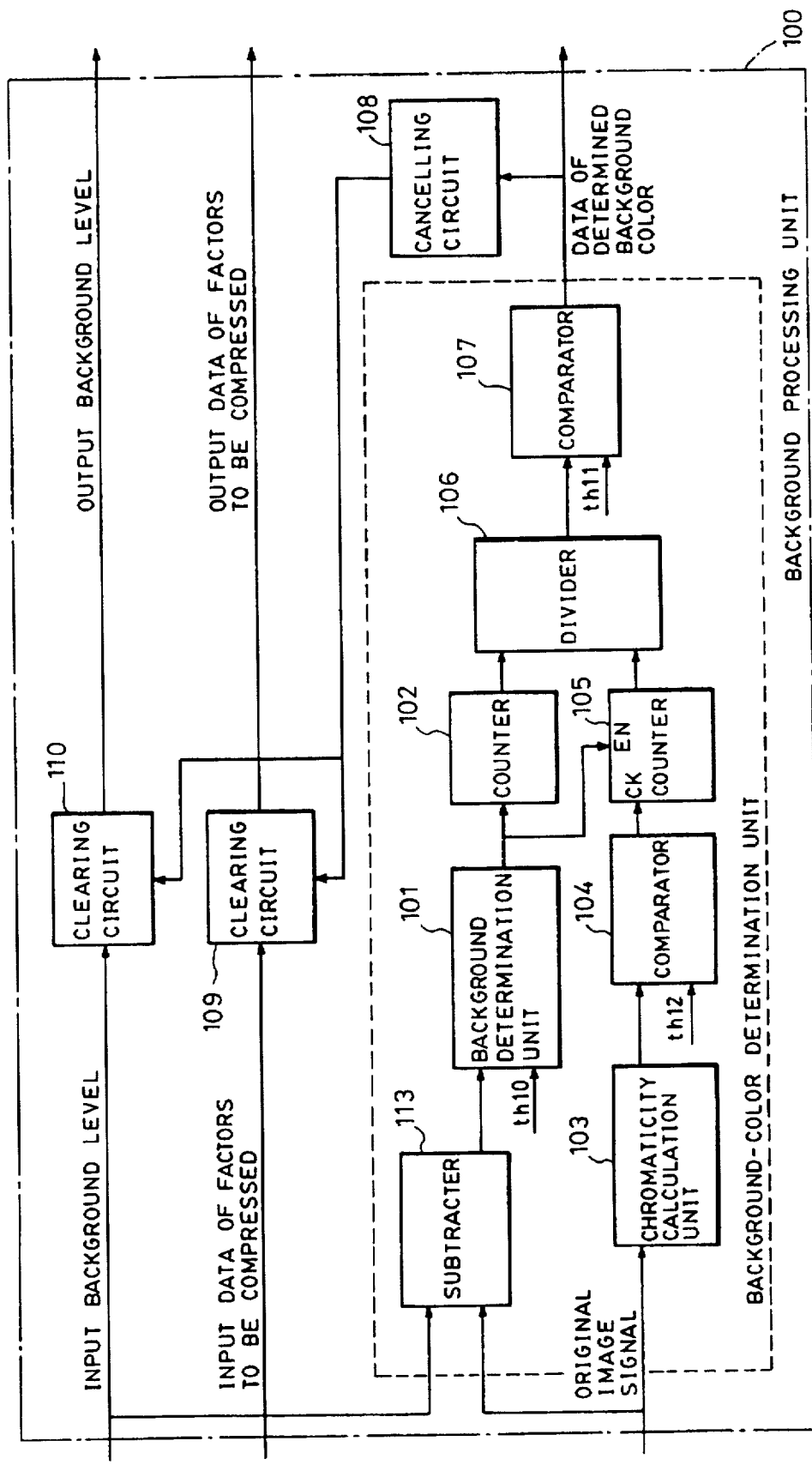
FIG. 10 is a diagram showing an example of a background processing unit.

FIG. 10 is a diagram showing an example of the configuration of the background processing unit 100. In FIG. 10, the input background level is subtracted from the original image signal in a subtracter 118, and the resultant signal is input to a background determination unit 101. The signal input to the background determination unit 101 is compared with a threshold value th 10. If the input signal is smaller than the value th 10, the signal is determined to be a signal from the background portion. The number of determinations of pixels as being of the background portion is counted by a counter 102. On the other hand, the chromaticity of the original image signal is calculated by a chromaticity calculation unit 103. In the calculation, R, G and B image data are first converted into signals L*, a* and b*, and the value of $\sqrt{a^{*2}+b^{*2}}$ is output. In place of this value, a value |a*|+|b*| may be output. Alternatively, a color space, such as Y, I and Q, L, U and V, Y, Cr and Cb, or the like, may be utilized. The output of the chromaticity calculation unit 103 is compared with a threshold value th 12 in a comparator 104. If the output value is greater than the value th 12, the signal is determined to be a signal from a color pixel, and is input to clock input terminal of a counter 105. The counter 105 is put in a count enable state only for a pixel determined as being from the background according to the output of the background determination unit 101. Hence, the number of color pixels in the background is counted by the counter 105.

By prescanning the image as described above, a result of dividing the value of the counter 105 by the value of the counter 102, that is, the ratio of color background image to background image, is obtained in a divider 106. This ratio is compared with a threshold value th 11 in a comparator 107. If the ratio is greater than the value th 11, the background portion of the processed image is determined to be a color background. In the case of a color background, the input background level and data of factors to be compressed are cleared to "0" by clearing circuits 110 and 109, respectively. Accordingly, in the case of a color background, all the data including background-portion data are binary-coded and encoded, and multivalue compression is not performed.

Figure 13:
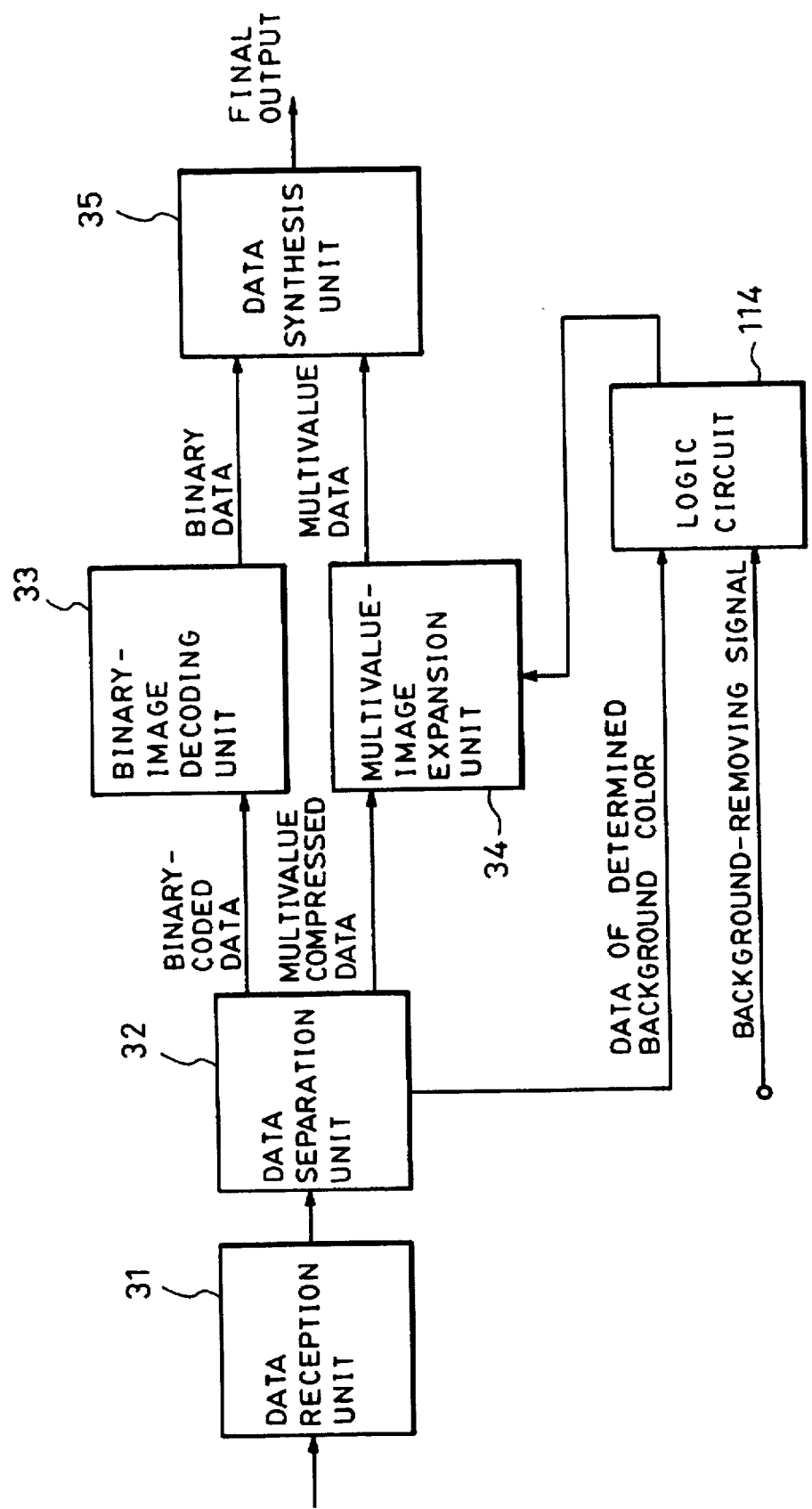
FIG. 13 is a block diagram of an image expansion unit of the modified embodiment.

By cancelling data for determining background color in a cancelling circuit 108, the input background level and data of factors to be compressed are output without being processed. In this case, the data of the determined background color output from the background processing unit 100 is supplied to synthesis unit 8, and is subjected to data transmission. In that case, as shown in FIG. 13, the data of the determined background color is separated in a data separation unit 32, and is input to a logic circuit 114. A background-removing signal has been input in advance to the logic circuit 114 in order to remove the background. In spite of the presence of the background-removing signal, the background is not removed if the data of the determined background color represents a color background. The background is removed only when the background-removing signal is present and the data of the determined background color represents a noncolor background. The background is removed by clearing output data of the multivalue-image expansion unit 34.

Figure 11:
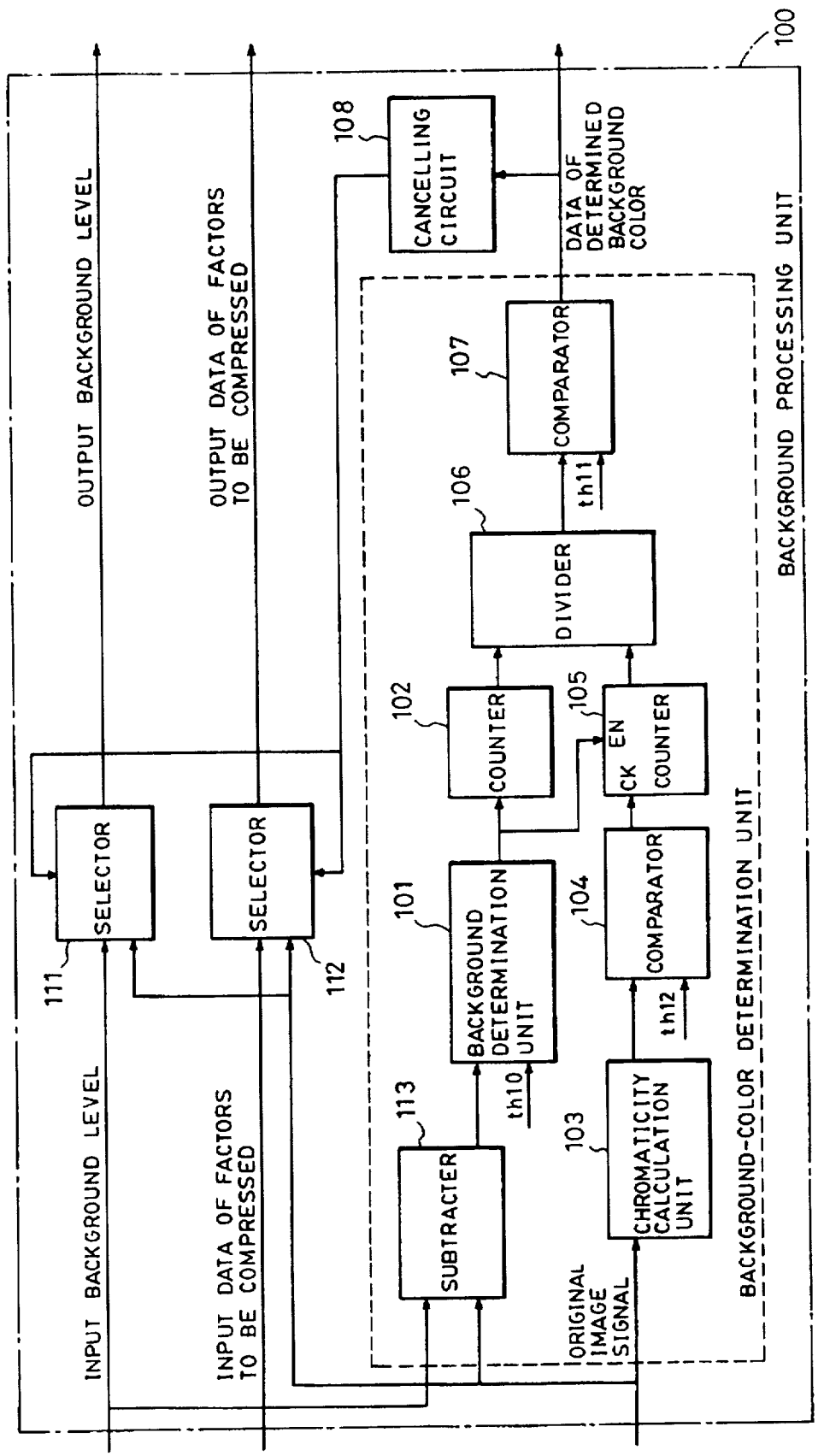
FIG. 11 is a diagram showing another example of the background processing unit.

FIG. 11 shows another example of the configuration of the background processing unit 100. The operation when the output of the comparator 107 is cancelled by the cancelling circuit 108 is the same as in the foregoing explanation.

When the output of the comparator 107 is not cancelled, data for determining background color is input to selectors 111 and 112 as control signals for the selectors. The input background level and original image signal are input to the selector 111. Input data of factors to be compressed and original image signal are input to the selector 112. When the data of the determined background color represents a black-and-white background, the background level and the data of factors to be compressed are selected by the selectors 111 and 112, respectively, and are output without being modified. The subsequent operation is the same as in the foregoing explanation. When the data of the determined background color represents a color background, both the selectors 111 and 112 select the original image signal to output the background level and data for factors to be compressed, respectively. Hence, the original image signals are subtracted from each other in a subtracter 2 shown in FIG. 12, and therefore the output of the substracter 2 is always 0. The original image data are compressed in a multivalue-image compression unit 8 without being modified. Accordingly, ADCT compression or the like may be utilized in the multivalue-image compression unit 3.

As explained above, according to the above-described embodiment of the present invention, by separating an image into two images, i.e., an image containing only the background portion of the signal (background-density level) and an image containing only the remaining portion of the signal, and separately encoding and compressing the two bodies of image data, it becomes possible to obtain an image having a high compression ratio without being influenced by the background level even in a character image binary-coded by an error diffusion method, or the like. Furthermore, it becomes possible to conserve the background when the background image is a color image, and remove the background when the background image is a black-and-white image.

Figure 14:
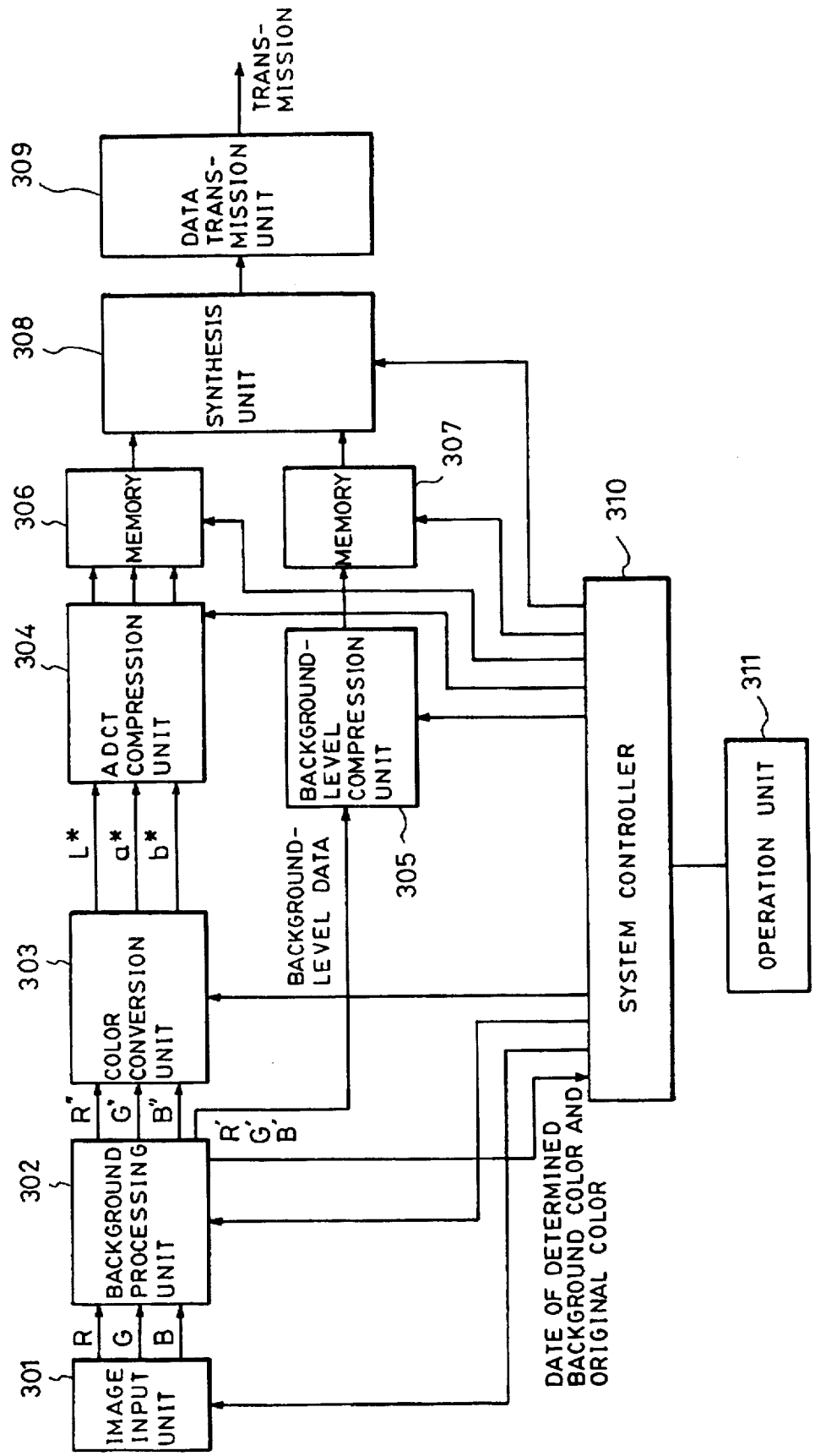
FIG. 14 is a block diagram of another embodiment of the present invention.

FIG. 14 is a diagram showing still another embodiment of the present invention. In FIG. 14, an image input unit 301 comprises a CCD (charge-coupled device) sensor or the like.

A background processing unit 302 performs processing to be described later. A color conversion unit 303 converts color-component signals R", G" and B" (color component data from which background data have been removed) into a luminance signal L* and chromaticity signals a* and b* An ADCT compression unit 304 performs image data compression according to an ADCT method of JPEG for respective converted components L*, a* and b*. A background-level compression unit 305 compresses (encodes) background-level data R', G' and B' extracted by the background processing unit 302. Memories 306 and 307 store output data from the ADCT compression unit 304 and the background-level compression unit 305, respectively. A synthesis unit 308 synthesizes data stored in the memories 306 and 307. A data transmission unit 309 transmits the synthesized data. A system controller 310 controls the above-described units. An operation unit 311 includes key input means for performing mode setting and the like.

Figure 15:
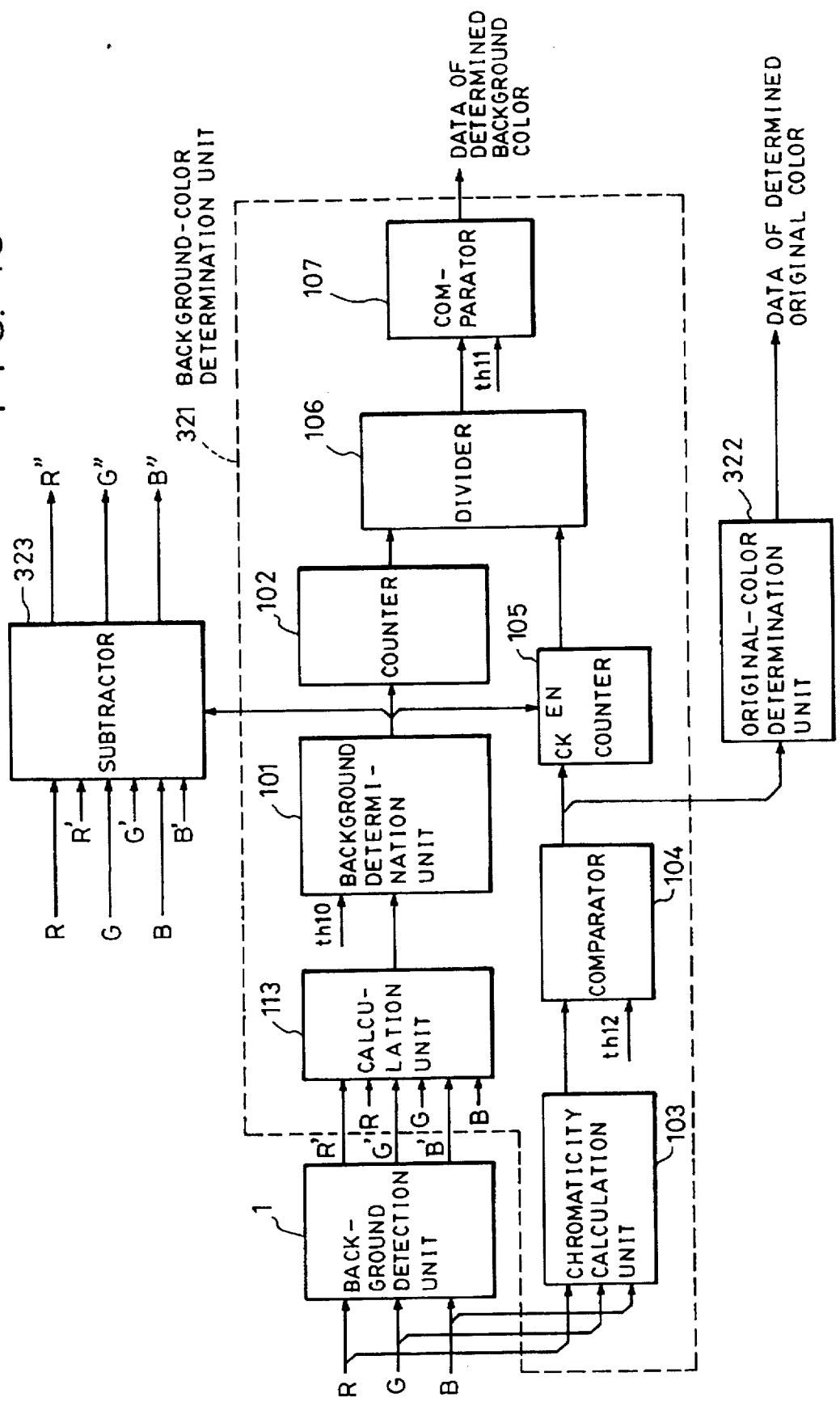
FIG. 15 is a diagram showing a background processing unit of the FIG. 14 embodiment.

FIG. 15 shows the details of the background processing unit 302.

Since the configuration of a background-color determination unit 321 is the same as that shown in FIG. 10 (the same reference characters indicating the same elements), explanation thereof will be omitted. In FIG. 15, in addition to the configuration of FIG. 10, there is provided an original-color determination unit 322 for determining whether the input image for one picture frame is a black-and-white image or a color image according to the result of black-and-white/color determination for respective pixels output from the comparator 104. In a subtracter 323, background-level data are subtracted only for pixels determined as being background for input image data R, G and B, and image data R", G" and B" from which background data have been removed are output.

Figure 16:
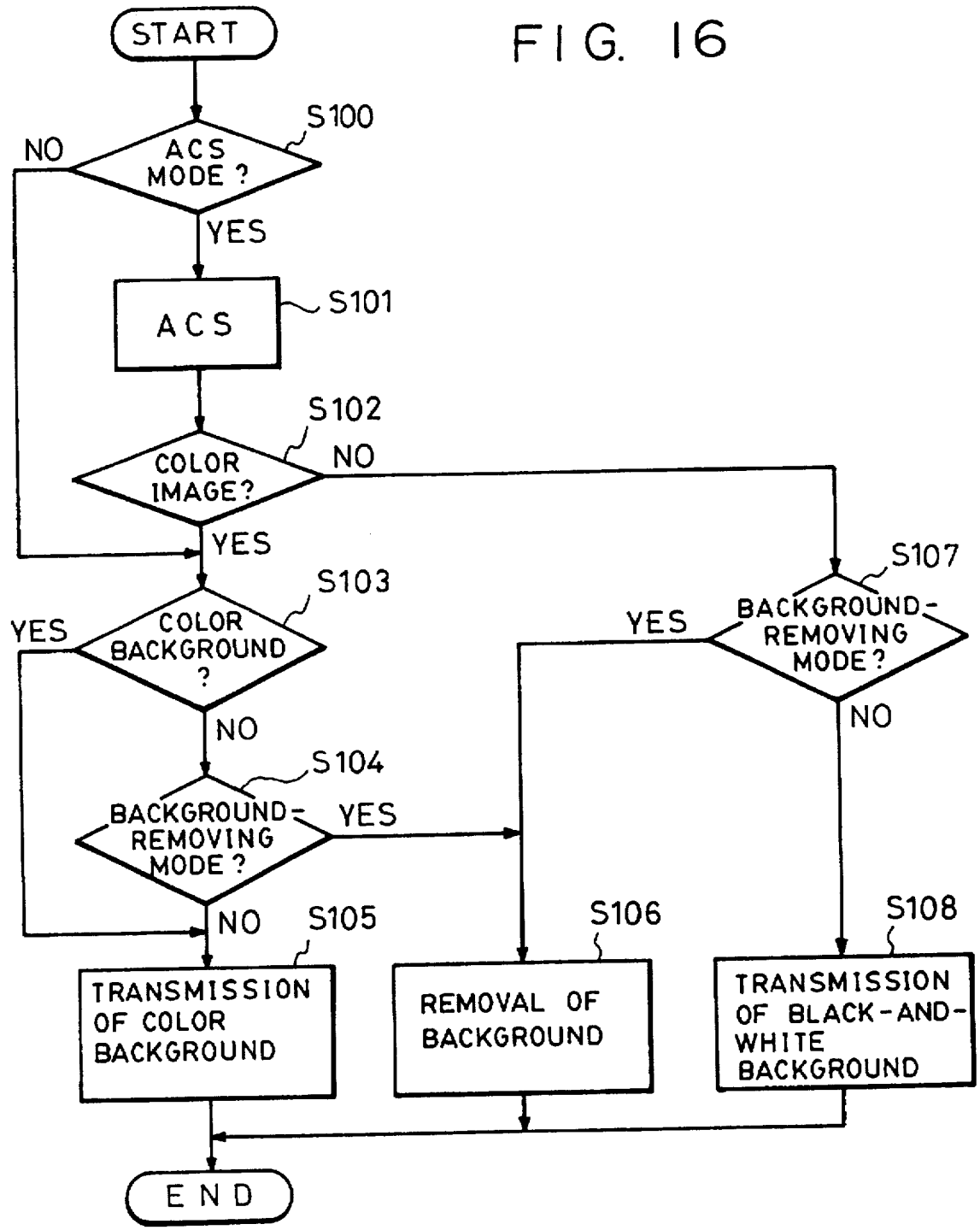
FIG. 16 is a diagram showing a control by a system controller.

FIG. 16 shows a control procedure carried out by the system controller 310 performed in the above-described configuration.

First, in step S100, it is determined whether or not an original-color-determining mode (ACS mode) is selected by the operation unit 311. If the result of the determination is affirmative, ACS processing is applied and it is determined whether the input image is a black-and-white image or a color image (steps S101 and S102). If the result of the determination is color, the process proceeds to step S103. When the ACS mode is selected, a counter provided within the original-color determination unit 322 counts the number of pixels determined as having chromatic colors. If the count value is less than a predetermined value, the original is determined as being a black-and-white original. In the case, the original is determined as being a color original. The result of the determination is transmitted to the system controller 310 as the data of the determined the color of the original.

When the original has been determined as being a color original in the ACS mode, it is determined whether or not the background is a color background in step S103. If the result of the determination is affirmative, the system is controlled so as to transmit background-color data (R', G' and B') (step S105). That is, the system controller 310 outputs a signal instructing to output background-level data to the background-level compression unit 305.

If the result of the determination in step S103 is negative, it is determined whether or not a background-removing mode is selected by the operation unit 311 (step S104). When the result of the determination is negative, the system is controlled so as to transmit background-density data y (step S105). If the result of the determination in step S104 is affirmative, the system is controlled so as not to transmit the background color (step S106). That is, the system controller 310 outputs a signal instructing not to output background-level data to the background-level compression unit 305.

When the original has been determined as being a black-and-white original in the ACS mode, it is determined whether or not the background-removing mode is selected (step S107). If the result of the determination is affirmative, the background is removed (step S106). If the result of the determination is negative, the black-and-white background is transmitted (step S108).

The above-described determination of the original color and the background color is performed by a prescanning operation by the image input unit (for example, a CCD scanner) 301.

When the image input unit 301 includes, for example, a memory capable of storing image data for one picture frame, the above-described determination of the original color and the background color is performed by reading data from the memory for preprocessing, apart from image processing for transmission from the memory.

Figure 17:
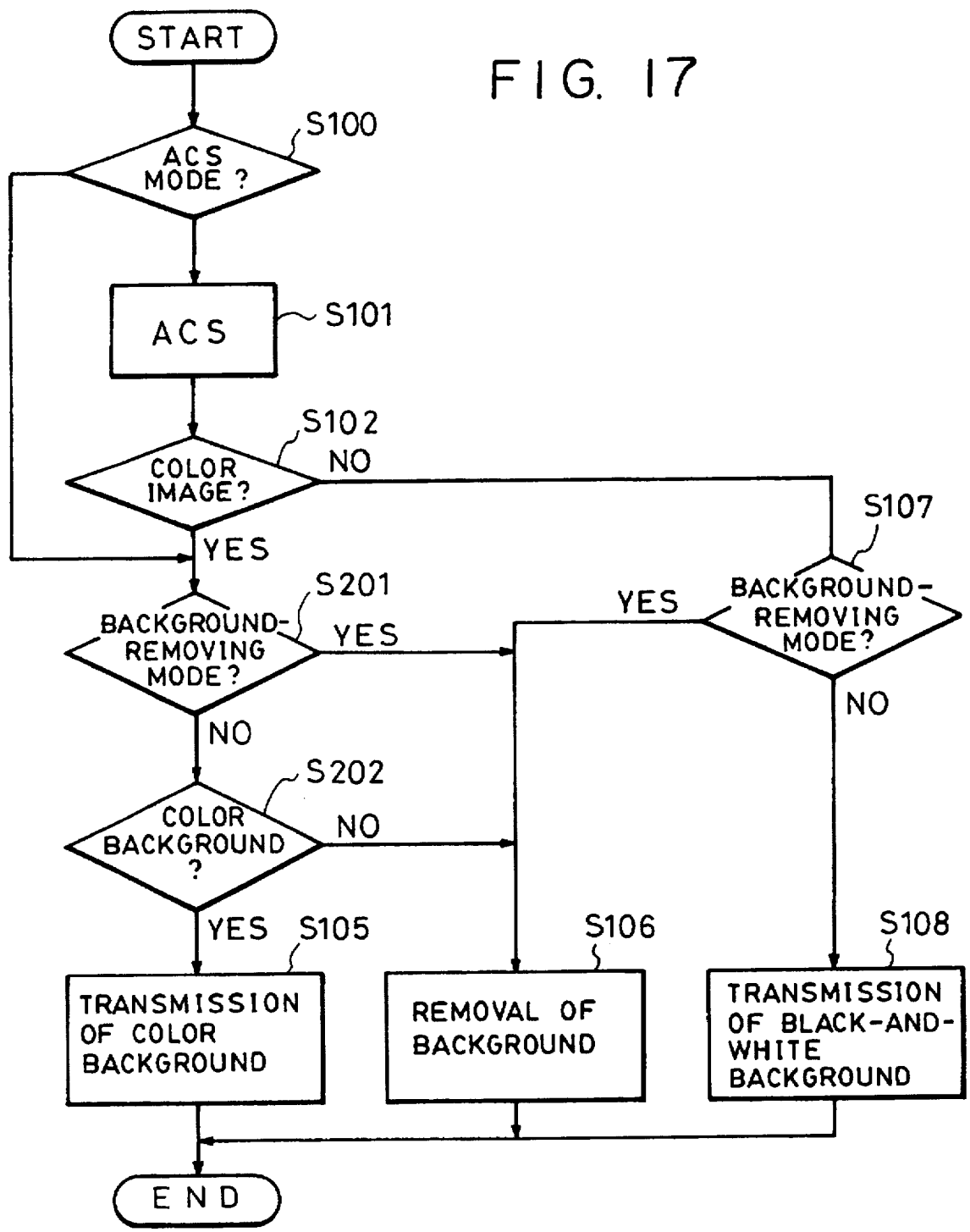
FIGS. 17, 18 and 19 are diagrams showing other types of control by the system controller.

FIG. 17 is a modified embodiment of the embodiment shown in FIG. 16. In this embodiment, when the original has been determined as being a color original in the ACS mode, it is determined whether or not the background-removing mode is selected (step S201). If the result of the determination is affirmative, the background is removed (step S106). If the result of the determination is negative, the whether background is a color background is determined (step S202). When the background is a color background, the color background is transmitted (step S105). When the background is a black-and-white background, the background is removed (step S106).

According to the present embodiment, even if the background-removing mode is not selected, it is possible to control transmission of the background in accordance with the background color.

Figure 18:
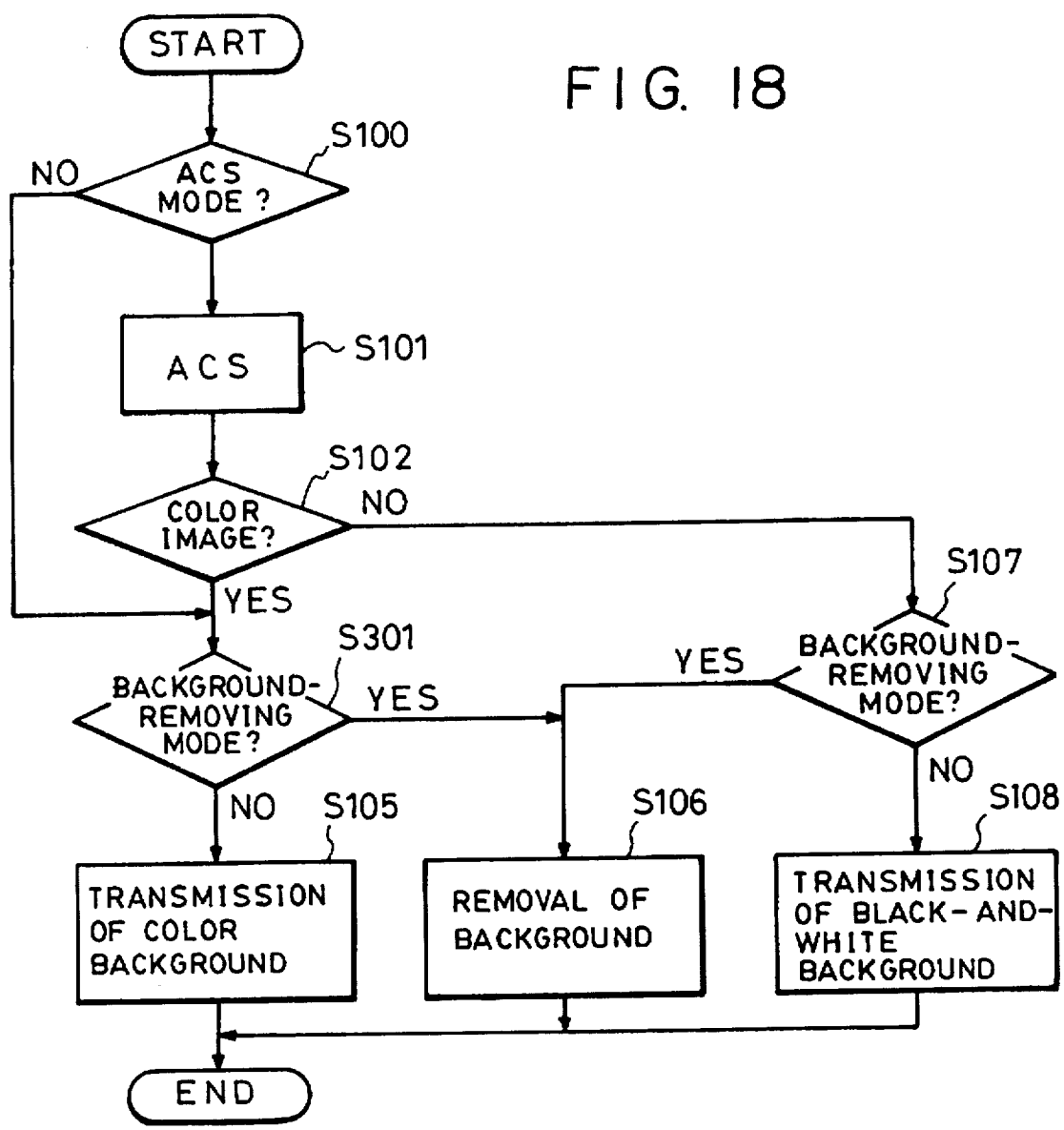

FIG. 18 is another modified embodiment of the embodiment shown in FIG. 16. In this embodiment, when the original has been determined as being a color original in the ACS mode, switching between removal of the background (step S106) and transmission of the background (step S105) is performed in accordance with whether or not the mode is the background-removing mode, no matter whether the background is a color background or not (step S301).

It is assumed that default corresponds to the background-transmitting mode when the original is a color original, and default corresponds to the background-removing mode when the original is a black-and-white original.

Figure 19:
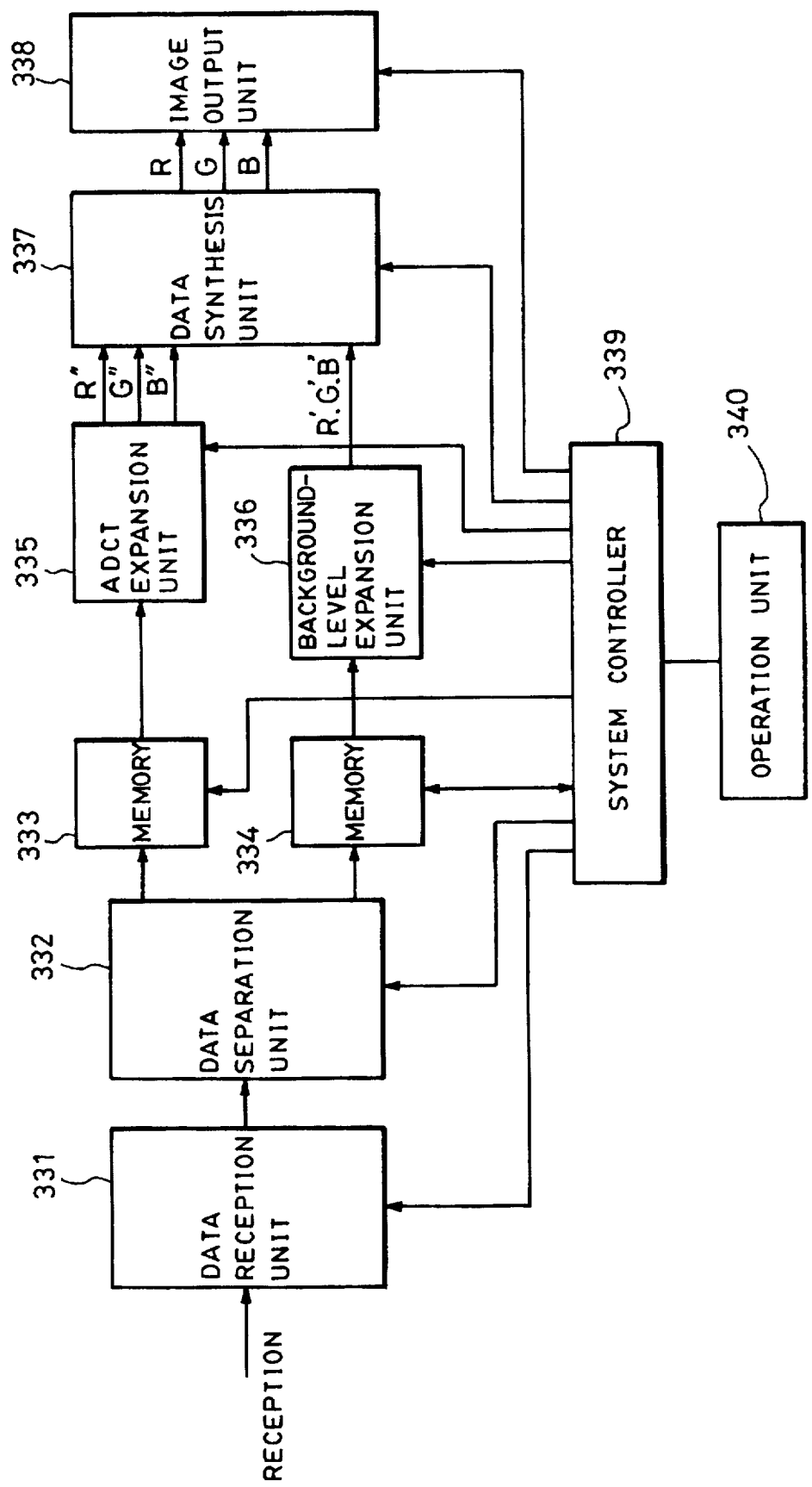

FIG. 19 is a block diagram showing the reception side of the embodiment shown in FIG. 14. In FIG. 19, there is shown a data reception unit 331. A data separation unit 332 separates multivalue data compressed according to the ADCT method and background-level data. Memories 333 and 334 store the respective separated data. An ADCT expansion unit 335 expands the data compressed according to the ADCT method and outputs R", G" and B" data. A background-level expansion unit 336 extracts background-level data R', G' and B' from compressed background-level data. A data synthesis unit 337 decodes values R, G and B for each pixel from the multivalue data R", G" and B" and the background-level data R', G' and B'. An image output unit 338 comprises a laser-beam printer, an ink-jet printer or the like. A system controller 339 controls the entire reception system. An operation unit 340 sets a background-removing mode wherein the operator at the reception side removes the background of an original which was transmitted including the background.

The reception side performs decoding of image data and output of an image according to a procedure which is the reverse of the procedure at the transmission side.

The system controller 339 determines the presence of background-level data according to the data stored in the memory 334, and controls so that the background-level data are not output from the background-level expansion unit 336 even if the background-level data are present, if the background-removing mode is called for by the operation unit 340.

In place of the above-described ADCT compression unit 304, another multivalue-image-data compression method may be used.

For the above-described image output unit 338, a so-called bubble-jet printer may be used which discharges liquid drops utilizing film boiling by thermal energy, as described, for example, in U.S. Pat. No. 4,723,129.

In FIG. 15, the background-color determination unit 321 may determine whether the portion other than the background is a black-and-white portion or a color portion. If the portion other than the background is a color portion, the background may not be removed. If the portion is a black-and-white portion, the background may be removed.

Figure 20:
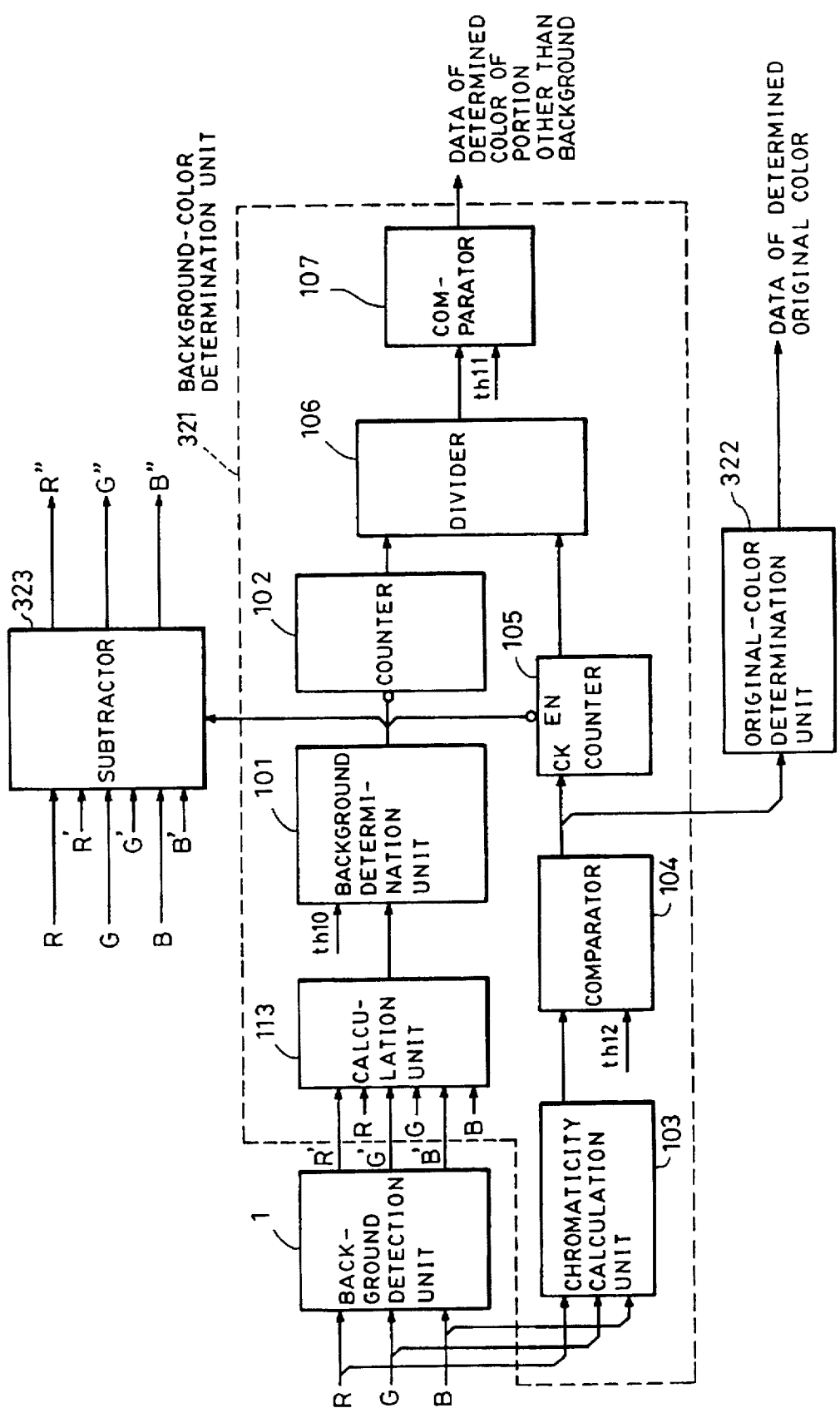
FIG. 20 is a diagram showing still another embodiment of the present invention.

That is, according to the configuration shown in FIG. 20, color/black-and-white determination for the portion other than the background may be performed, and the background color may be removed in accordance with the result of the determination.

The system controller at the transmission side may perform transmission of image data while removing the background color if the reception side can output only a black-and-white image due to a protocol with the reception side.

As described above, according to the present invention, it is possible to obtain an image processing apparatus which improves the compression efficiency while maintaining an excellent image. It is also possible to provide an image processing apparatus having an excellent operability.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A color image processing apparatus comprising:
    input means for inputting first color image data representing a first color image of a picture;
    judging means for judging a background color in the first color image on the basis of the first color image data input by said input means;
    removing means for removing the background color judged by said judging means from at least a part of the first color image and thereby generating second color image data representing a second color image of the picture, the second color image not including the background color; and
    encoding means for encoding the second color image of the picture and outputting encoded data.

2. The color image processing apparatus according to claim 1, further comprising combining means for combining data representing the background color with the encoded data output by the encoding means and outputting the combined data.

3. The color image processing apparatus according to claim 1, wherein the background color judged by said judging means varies in accordance with the first color image data input by said input means.

4. A method of color image processing comprising the steps of:
    inputting first color image data representing a first color image of a picture;
    judging a background color in the first color image on the basis of the first color image data input in said inputting step;
    removing the background color judged in said judging step from at least a part of the first color image and thereby generating second color image data representing a second color image of the picture, the second color image not including the background color;
    encoding the second color image data; and
    outputting the encoded data.

5. The method of color image processing according to claim 4, further comprising the steps of:
    combining data representing the background color with the encoded data output in said outputting step; and
    outputting the combined data.

6. The method of color image processing according to claim 4, wherein the background color judged in said judging step varies in accordance with the first color image data input in said inputting step.

7. A method of image processing comprising the steps of:
    inputting image data;
    determining whether the input image data input in said inputting step represents a color image or a black-and-white image;
    detecting a background color of an image represented by the input image data; and
    removing the background color from the image data when it is determined in said determining step that the input image data represents the black-and-white image.

8. The method according to claim 7, wherein said detecting step comprises the step of detecting the background color according to a distribution of a histogram of the input image data.

9. The method according to claim 7, further comprising an encoding step for encoding the image data from which the background color has been removed in said removing step.

10. A method of image processing comprising the steps of:
    inputting image data;
    detecting a background color of an image represented by the input image data input in said inputting step;
    determining whether the image other than its background-color portion is a color image or a black-and-white image; and
    removing the background color from the image when it is determined in said determining step that the image other than the background-color portion is the black-and-white image.

11. The method according to claim 10 wherein said detecting step comprises the step of detecting the background color according to a distribution of a histogram of the input image data.

12. The method according to claim 10, further comprising the step of encoding the image data from which the background color has been removed in said removing step.

13. A color image processing apparatus comprising:

input means for inputting color image data having a plurality of color components;

detecting means for detecting backgroud color of a color image represented by the input color image data input by said input means;

removing means for removing the background color from the color image data having the plurality of color components;

encoding means for encoding the color image data with the background color removed;

transmission means for transmitting the color image data with the background color removed encoded by said encoding means; and selecting means for manually selecting between a first mode, in which said removing means is operated, and a second mode, in which said removing means is not operated.

14. An apparatus according to claim 13, wherein said detecting means detects the background color according to a distribution of a histogram of the input color image data.

15. A color image processing method comprising the steps of:

inputting color image data having a plurality of color components;

detecting background color of a color image represented by the input color image data input in said inputting step;

removing the background color from the color image data having the plurality of color components;

encoding the color image data after removal of the background color in said removing step;

transmitting the encoded color image; and manually selecting between a first mode, in which said removinq step is performed, and a second mode, in which said removing step is not performed.

16. A color image processing apparatus comprising:

input means for inputing color imaaqe data having a plurality of color components;

detectinq means for detecting background color of a color image represented by the input color image data input by said input means;

removing means for removing the background color from the color image having the plurality of color components;

encoding means for encoding the color image data with the background color removed;

transmitting means for transmitting the color image data with the background color removed encoded by said encoding means; and control means for controlling said removing means so as to operate or so as not to operate in accordance with an apparatus at the reception side of transmission by said transmission means.

17. A color image processing apparatus comprising:

receiving means for receiving encded color image data having a plurality of color components;

decoding means for decoding the encoded color image data to output reproducing color image data having a plurality of color components;

removing means for removing background color of a color image represented by the reproducing color image data; and selecting means for manually selecting between a first mode, in which said removing means is operated, and a second mode, in which said removing means is not operated.

18. An apparatus according to claim 17, further comprising detecting means for detecting the background color removed by said removing means.

19. An apparatus according to claim 18, wherein said detecting means detects the background color by analyzing the received encoded color image data removed by said removing means.

20. A color image processing method comprising the steps of:

receiving encoded color image data having a plurality of color components;

decoding the encoded color image data and outputting reproducing-color image data having a plurality of color components;

removing background color of a color image represented by the reproducing-color image data; and manually selecting between a first mode, in which said removing step is performed, and a second mode, in which said removing step is not performed.

21. An image processing apparatus comprising:

input means for inputting image data;

determining means for determining whether the input image data input by said input means represents a color image or a black-and-white image;

detecting means for detecting a background color of an image represented by the input image data; and removing means for removing the background color from the image data when said determining means determines that the input image data represents the black-and-white image.

22. An apparatus according to claim 21, wherein said detecting means detects the background color according to a distribution of a histogram of the input image data.

23. An apparatus according to claim 21, wherein said input means comprises a scanner further comprising a CCD (charge-coupled device) sensor, and wherein said determining means and detecting means are operated during a prescanning operation of said scanner.

24. An apparatus according to claim 21, further comprising selecting means for manually selecting between a first mode, in which said removing means is operated, and a second mode, in which said removing means is not operated.

25. An apparatus according to claim 21, further comprising encoding means for encoding the image data from which the background color has been removed by said removing means.

26. An image processing apparatus comprising:

input means for inputting image data;

detecting means for detecting a background color of an image represented by the input image data input by said input means;

determining means for determining whether the image other than its background-color portion is a color image or a black-and-white image; and removing means for removing the background color from the image when said determining means determines that the image other than the background-color portion is the black-and-white image.

27. An apparatus according to claim 26, wherein said detecting means detects the background color according to a distribution of a histogram of the input image data.

28. An apparatus according to claim 26, wherein said input means comprises a scanner further comprising a CCD (charge-coupled device) sensor, and wherein said determining means and detecting means are operated during a prescanning operation of said scanner.

29. An apparatus according to claim 26, further comprising selecting means for manually selecting between a first mode, in which said removing means is operated, and a second mode, in which said removing means is not operated.

30. An apparatus according to claim 26, further comprising encoding means for encoding the image data from which the background color has been removed by said removing means.

31. A color image processing method comprising the steps of:

inputting color image data having a plurality of color components;

detecting background color of a color image represented by the input color image data input in said inputting step;

removing the background color from the color image data having the plurality of color components;

encoding the color image data after removal of the background color in said removing step;

transmitting the encoded color image; and controlling so as to perform or so as not to perform said removing step in accordance with an apparatus at the reception side of transmission of said transmitting step.

* * * * *

UNITED STATES PATENT AND TRADEMARK OFFICE
CERTIFICATE OF CORRECTION

PATENT NO.  : 5,706,368
DATED       : January 6, 1998
INVENTOR(S) : YOSHINOBU MITA Page 1 of 2

It is certified that error appears in the above-identified patent and that said Letters Patent is hereby corrected as shown below:

COLUMN 2
  Line 15, "cation" should read --cation.--.

COLUMN 3
  Line 2, "deretlon" should read --detection--.

COLUMN 5
  Line 23, "OR" should read --OR--.

COLUMN 6
  Line 7, "Bur 74." should read --Buf 74.--;
  Line 9, "Bur" should read --Buf--;
  Line 11, "Bur 74." should read --Buf 74.--

COLUMN 7
  Line 27, "unit 1." should read --unit 100.--;
  Line 37, "subtracter 118," should read --subtracter 113,--

COLUMN 10
  Line 30, delete "the" (3rd occurrence);
  Line 31, "whether" should read --whether the--.

UNITED STATES PATENT AND TRADEMARK OFFICE
CERTIFICATE OF CORRECTION

PATENT NO. : 5,706,368

DATED : January 6, 1998

INVENTOR(S) : YOSHINOBU MITA

It is certified that error appears in the above-identified patent and that said Letters Patent is hereby corrected as shown below:

COLUMN 12
   Line 61, "claim 10" should read --claim 10,--

COLUMN 13
   Line 59, "encded" should read --encoded--.

Signed and Sealed this

Thirtieth Day of June, 1998

Attest:

BRUCE LEHMAN

Attesting Officer    Commissioner of Patents and Trademarks